United States Patent
Ryba et al.

(10) Patent No.: US 11,441,620 B2
(45) Date of Patent: Sep. 13, 2022

(54) ELECTRIC CLUTCH ACTUATOR WITH A ONE-PIECE HOUSING

(71) Applicant: FTE automotive GmbH, Ebern (DE)

(72) Inventors: Juergen Ryba, Ebern (DE); Dimitri Ostrohov, Ebern (DE); Frank Sauerteig, Ebern (DE); Michael Erdmann, Ebern (DE); Christian Sperber, Ebern (DE)

(73) Assignee: FTE automotive GmbH, Ebern (DE)

( * ) Notice: Subject to any disclaimer, the term of this patent is extended or adjusted under 35 U.S.C. 154(b) by 309 days.

(21) Appl. No.: 16/571,497

(22) Filed: Sep. 16, 2019

(65) Prior Publication Data

US 2020/0088247 A1    Mar. 19, 2020

(30) Foreign Application Priority Data

Sep. 19, 2018  (DE) .................... 10 2018 123 039.7

(51) Int. Cl.
| | |
|---|---|
| *F16D 28/00* | (2006.01) |
| *F16D 23/00* | (2006.01) |
| *H02K 5/06* | (2006.01) |
| *H02K 7/06* | (2006.01) |
| *H02K 7/108* | (2006.01) |

(Continued)

(52) U.S. Cl.
CPC ............ *F16D 28/00* (2013.01); *F16D 23/00* (2013.01); *H02K 5/06* (2013.01); *H02K 7/06* (2013.01); *H02K 7/108* (2013.01); *H02K 7/116* (2013.01); *H02K 21/14* (2013.01); *F16D 2300/18* (2013.01); *F16H 25/2214* (2013.01); *H02K 2213/12* (2013.01)

(58) Field of Classification Search
CPC .......... F16D 28/00; F16D 23/00; F16D 23/12; F16D 2023/123; F16D 2300/18; H02K 5/06; H02K 7/06; H02K 7/10; H02K 7/108; H02K 7/116; H02K 21/14; H02K 2213/12; F16H 2025/2081
See application file for complete search history.

(56) References Cited

U.S. PATENT DOCUMENTS 6,003,395 A * 12/1999 Rogg .................... B60W 10/02
                                                                74/335
6,907,967 B1 * 6/2005 Kapaan .................. F16H 25/22
                                                                188/162

(Continued)

FOREIGN PATENT DOCUMENTS

| | | |
|---|---|---|
| CN | 105743278 A | 7/2016 |
| DE | 102 16 136 A1 | 10/2003 |
| DE | 10 2016 222 149 A1 | 5/2017 |

OTHER PUBLICATIONS

German Search report dated Feb. 25, 2019 in German Application 10 2018 123 039.7, filed on Sep. 19, 2018 (with English Translation of Categories of Cited Documents).

(Continued)

*Primary Examiner* — Richard M Lorence
(74) *Attorney, Agent, or Firm* — Oblon, McClelland, Maier & Neustadt, L.L.P.

(57) ABSTRACT

An electric clutch actuator having an electric motor, a gear mechanism and a spindle which is coupled to the electric motor via the gear mechanism, wherein the spindle, the gear mechanism and the electric motor are received in a housing configured in one piece.

7 Claims, 11 Drawing Sheets

(51) Int. Cl.
*H02K 7/116* (2006.01)
*H02K 21/14* (2006.01)
*F16H 25/22* (2006.01)

(56) References Cited

U.S. PATENT DOCUMENTS

| | | |
|---|---|---|
| 2007/0103010 A1 | 5/2007 | Kouzu et al. |
| 2011/0194954 A1* | 8/2011 | Sakata ................. F04C 15/008 417/410.1 |
| 2012/0227524 A1* | 9/2012 | Takahashi ............ H02K 11/215 74/89.34 |
| 2017/0207684 A1 | 7/2017 | Amanuma et al. |

OTHER PUBLICATIONS

Hutte Das Ingenieurswissen. 32. Berlin:Springer, 2004-ISBN 3-540-20325-7, 8 pages.

Extended European Search Report dated Dec. 11, 2019 in European Patent Application No. 19197664.6, 8 pages.

* cited by examiner

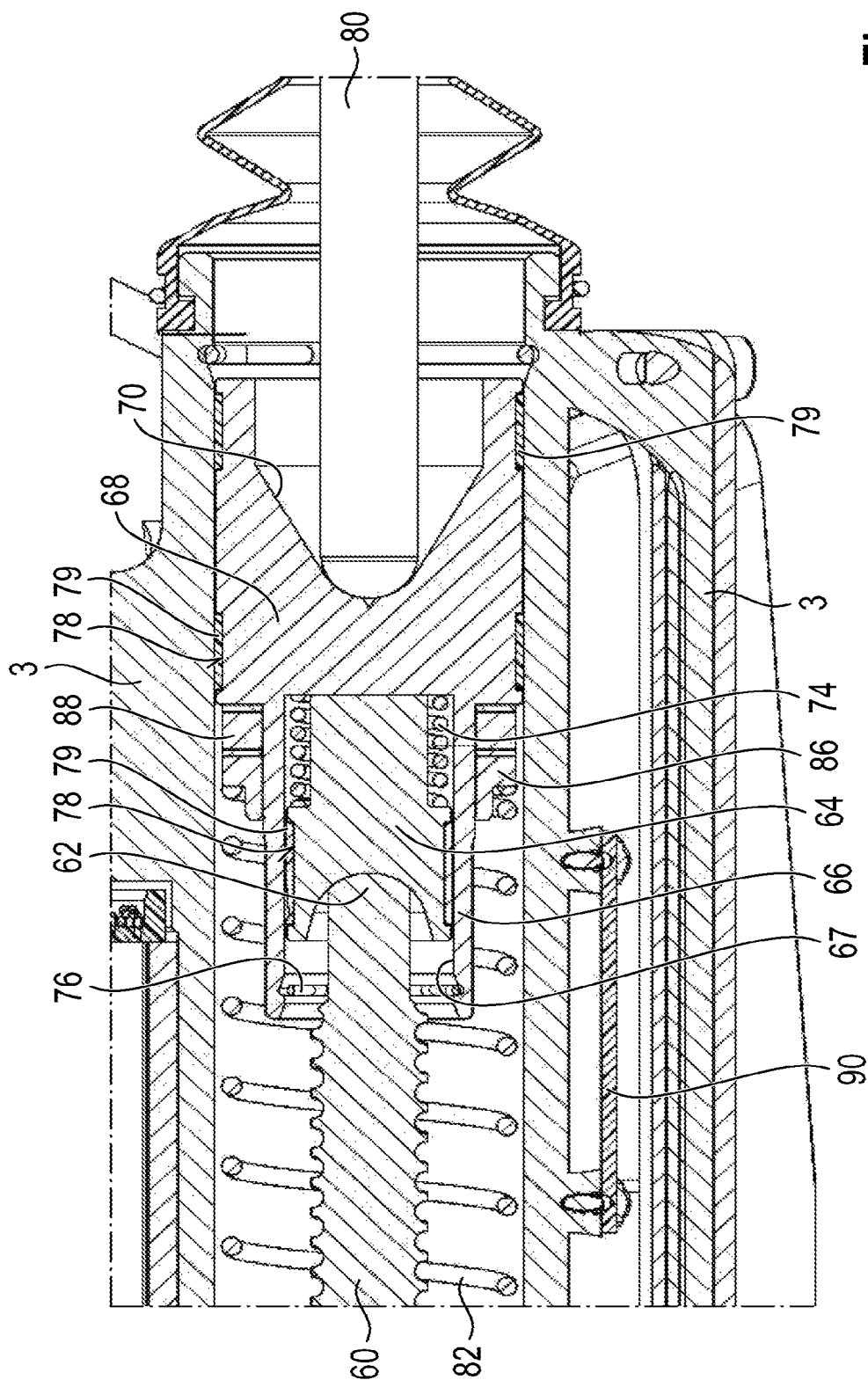

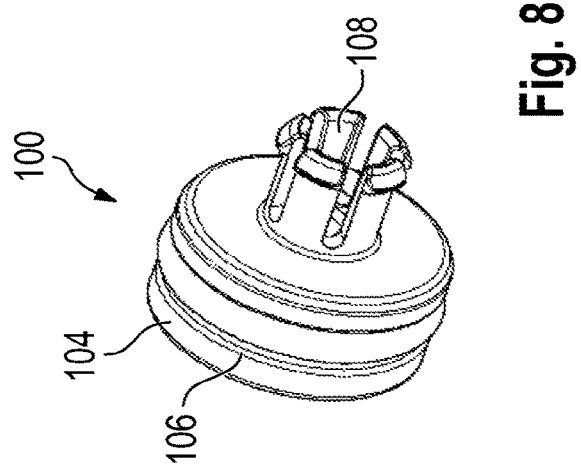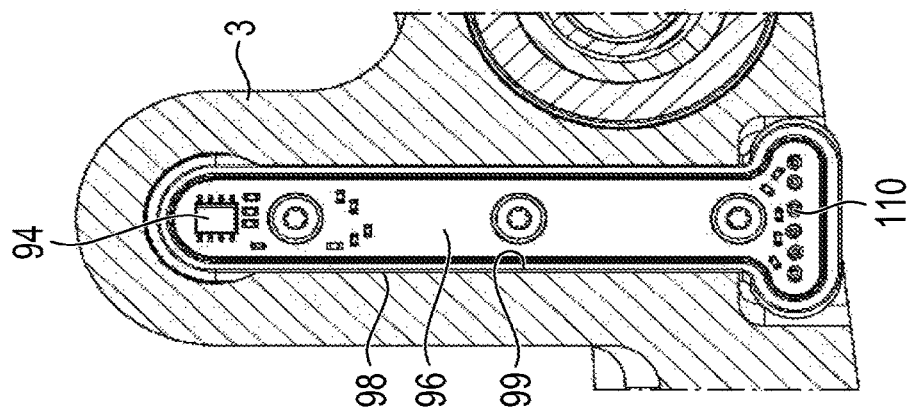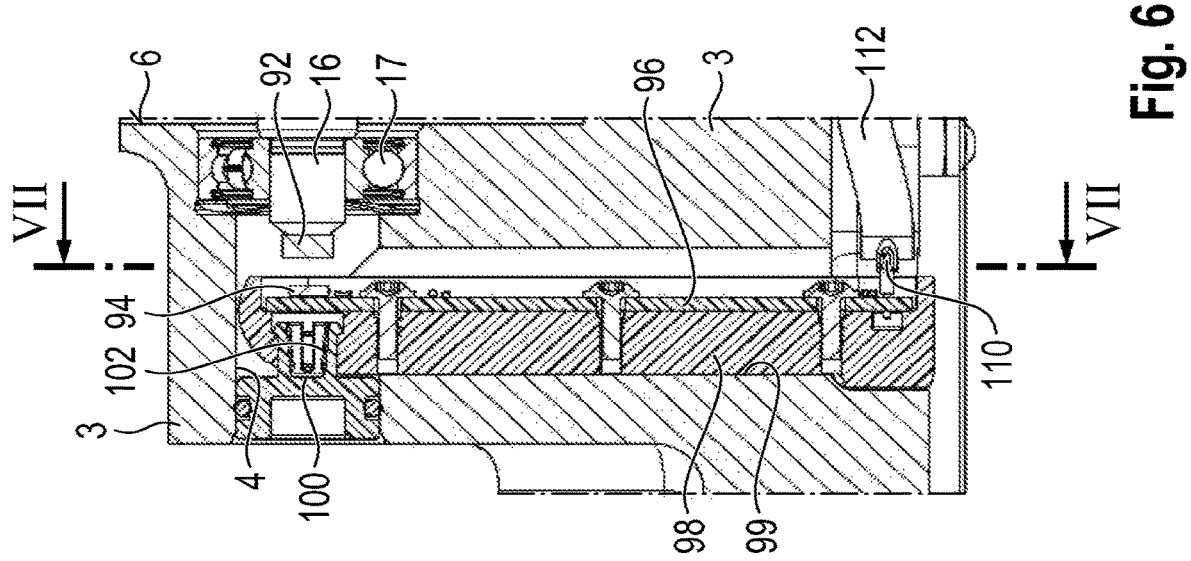

ELECTRIC CLUTCH ACTUATOR WITH A ONE-PIECE HOUSING

BACKGROUND OF THE INVENTION

Field of the Invention

The invention relates to an electric clutch actuator having an electric motor, a gear mechanism and a spindle which is coupled to the electric motor via the gear mechanism.

Description of the Related Art

The clutch actuator serves particularly to actuate a clutch in the drive train of a lorry. For this purpose, the spindle is coupled to a disengagement lever of the clutch such that the desired disengagement force can be applied via the necessary disengagement stroke.

The disengagement force can lie in the order of magnitude of 5 to 7 kN, and the stroke of the spindle for disengagement can be in the order of magnitude of 25 mm. During disengagement of the clutch, this stroke must be overcome in about 200 milliseconds. In order to be able to compensate for the wear travel of the clutch, an overall stroke of about 80 mm is provided.

In spite of these high requirements on the performance of the clutch actuator, the latter has to be very smooth-running since it is required that, in the event of a defect, the spindle can be pressed back by the clutch spring into the engaged position. Here, the motor, the gear mechanism and the spindle are intended to be designed such that the return speed is reduced.

BRIEF SUMMARY OF THE INVENTION

With regard to the requirements on the electric clutch actuator, in particular in terms of the installation space, the object of the invention consists in providing a particularly compact clutch actuator.

According to the invention, there is provision here that the spindle, the gear mechanism and the electric motor are received in a housing configured in one piece. As a departure from the prior art, where the electric motor customarily has a separate housing which is mounted on the housing receiving the spindle, use is made according to the invention of an, in particular cast, housing configured in one piece. The invention is here based on the finding that the disadvantage of a relatively complex casting operation is overcompensated for by the overall smaller dimensions. In particular, the partition between the electric motor and the receiving space for the spindle can be configured with a very thin wall such that a very small distance between the axis of rotation of the electric motor and the centre axis of the spindle can be obtained. Furthermore, the effort involved in assembling the clutch actuator is reduced since there is no need to mount a separate electric motor housing on a gear mechanism housing.

The electric motor preferably has a stator which is adhesively bonded into a cylindrical stator receptacle. This, too, leads to very compact dimensions, since mechanical means for fastening the stator can be dispensed with.

Alternatively, the stator is screwed into the stator receptacle or mechanically fastened in some other way.

The stator receptacle preferably has a bottom in which a mounting opening is provided which is configured concentrically with the stator receptacle. The mounting opening can be used when mounting the rotor of the electric motor within the stator to ensure that the rotor, in spite of the strong magnets provided thereon, does not contact the stator when it is inserted into the latter.

According to one embodiment of the invention, there is provision that the gear mechanism has a base plate which is inserted into an axial end of the housing. The base plate serves to receive the various components of the gear mechanism, with the result that they are all mounted on the same component, with the result that undesired tolerance chains can be avoided.

A cover is preferably provided which closes the housing on an axial side, wherein the base plate is braced against the housing by the cover. In this configuration, separate fastening means for mounting the base plate in the housing are not required.

Alternatively or additionally, however, there can be provision that the base plate is screwed to the housing.

The housing preferably consists of an aluminium die-cast material, with the result that a low overall weight combined at the same time with very good heat-conducting capacity is obtained.

According to the preferred embodiment, a sliding guide for a carriage is provided on the housing and is mounted on the spindle in a rotationally fixed manner. The sliding guide ensures that the spindle does not rotate about its longitudinal axis when a spindle nut in which the spindle engages is driven, in order to obtain the desired longitudinal adjustment of the spindle as a result of rotation of the spindle nut.

According to a further aspect of the invention, it relates to a modular system with a one-piece housing for an electric clutch actuator, in particular a clutch actuator of the aforementioned type, wherein the housing has a stator receptacle and a receiving space for a gear mechanism and a spindle, and with a 12V stator and a 24V stator which have identical external dimensions adapted to the stator receptacle and can each be fastened in the stator receptacle, in particular can be adhesively bonded therein. This modular system makes it possible, with an identical housing, to construct clutch actuators which are suitable for different vehicle electrical system voltages. The (substantially) sole adaptation consists in fastening the respectively suitable stator in the stator receptacle.

BRIEF DESCRIPTION OF THE SEVERAL VIEWS OF THE DRAWINGS

The invention will be described below on the basis of an embodiment which is illustrated in appended drawings. In these drawings:

FIG. 5 shows the detail V of FIG. 1 on an enlarged scale;

FIG. 6 shows the region VI of FIG. 1 in a section plane which differs from the section plane of FIG. 1;

FIG. 7 shows a section along the plane VII-VII of FIG. 6;

FIG. 8 shows the plug shown in FIG. 6 in a perspective view;

DETAILED DESCRIPTION OF THE INVENTION

Figure 1:
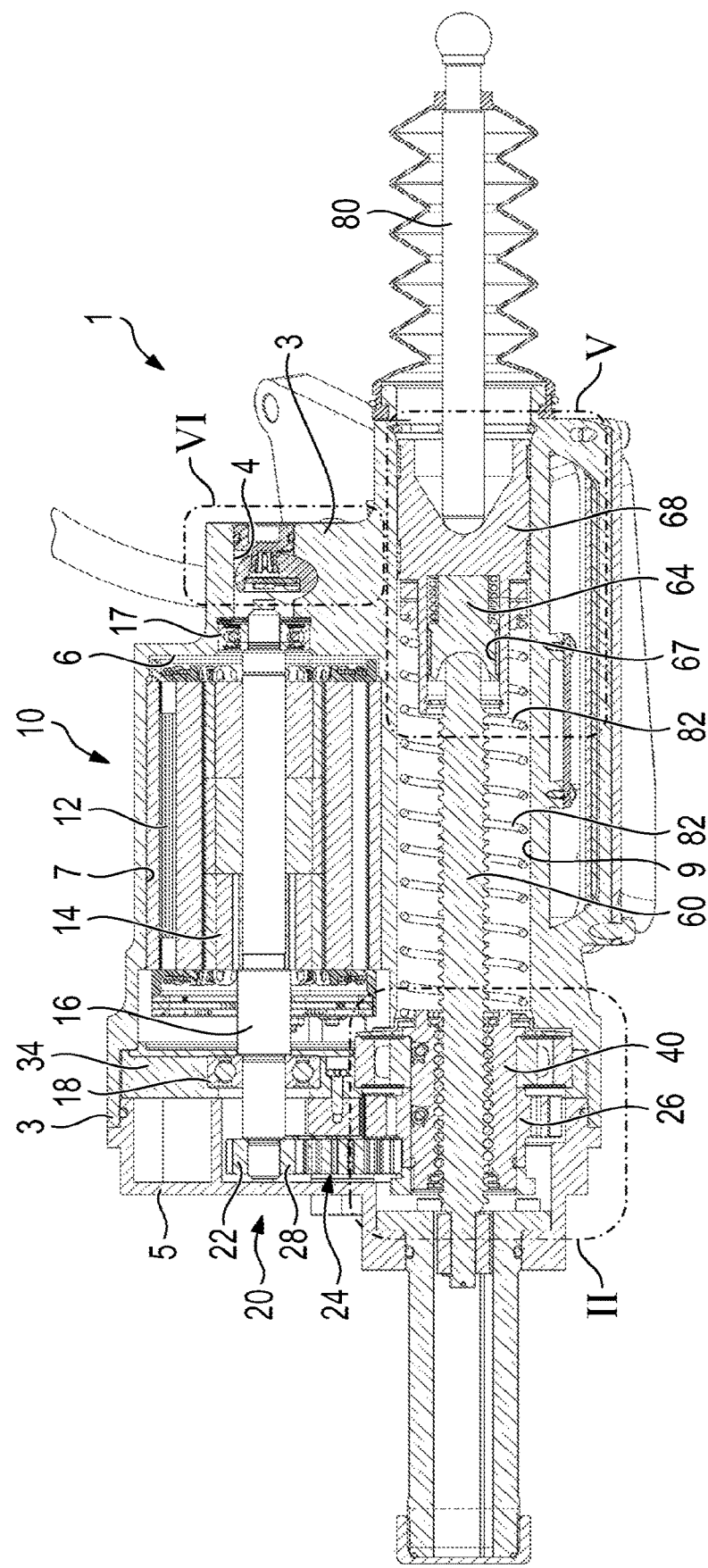
FIG. 1 shows a longitudinal section through a clutch actuator.

An electric clutch actuator can be seen in FIG. 1 that serves to actuate a disengagement lever of a friction clutch which is arranged in the drive train of a motor vehicle, in particular of a lorry.

The clutch actuator 1 has an electric motor 10 which is coupled to a spindle nut 40 via a gear mechanism 20. The spindle nut 40 is fixed in the axial direction and is seated on a spindle 60 which can be adjusted in the axial direction by rotation of the spindle nut 40. The spindle 60 interacts with a pressure plunger 80 which in turn interacts with a disengagement lever of the clutch (not shown here).

The spindle nut 40 is a recirculating ball nut here, resulting in low friction between the spindle and the spindle nut.

The supporting constituent part of the clutch actuator 1 is a housing 3 which (apart from a cover 5) is configured in one piece. A stator receptacle 7 and a spindle guide 9 are provided in particular in the housing 3.

Since the housing is configured in one piece, in particular being cast, the wall thickness between the stator receptacle 7 and the spindle guide 9 can be configured to be comparatively thin. This results overall in very small dimensions, in particular a small distance between the centre axis of the electric motor 10 and the centre axis of the spindle 60.

An aluminium alloy is preferably used as the material for the housing 3. The production process preferably used is a die-casting process.

The electric motor 10 is a brushless electric motor which has a stator 12 and a rotor 14. The stator 12 contains a plurality of stator windings which are adapted to the respective requirements. The rotor 14 has a plurality of permanent magnets. The latter are arranged on a motor shaft 16 which is mounted in the housing 3 by means of rolling bearings 17, 18.

The housing 3 has a mounting opening 4 on the bottom 6 of the stator receptacle 7. The mounting opening 4 serves to guide the rotor 14 when it is inserted into the stator 12. For this purpose, a suitable tool can be inserted into the mounting opening 4. The mounting opening 4 is in particular a locating bore.

The gear mechanism 20 has a pinion 22 which is connected to the motor shaft 16 for conjoint rotation, an intermediate gear wheel 24 and driving teeth 26 which are assigned to the recirculating ball nut 40.

The driving teeth 26 are here part of a driving gear wheel which is connected to the recirculating ball nut 40 for conjoint rotation. According to an alternative embodiment, the driving teeth 26 are formed in one piece on the outer circumferential surface of the recirculating ball nut 40.

Figure 4:
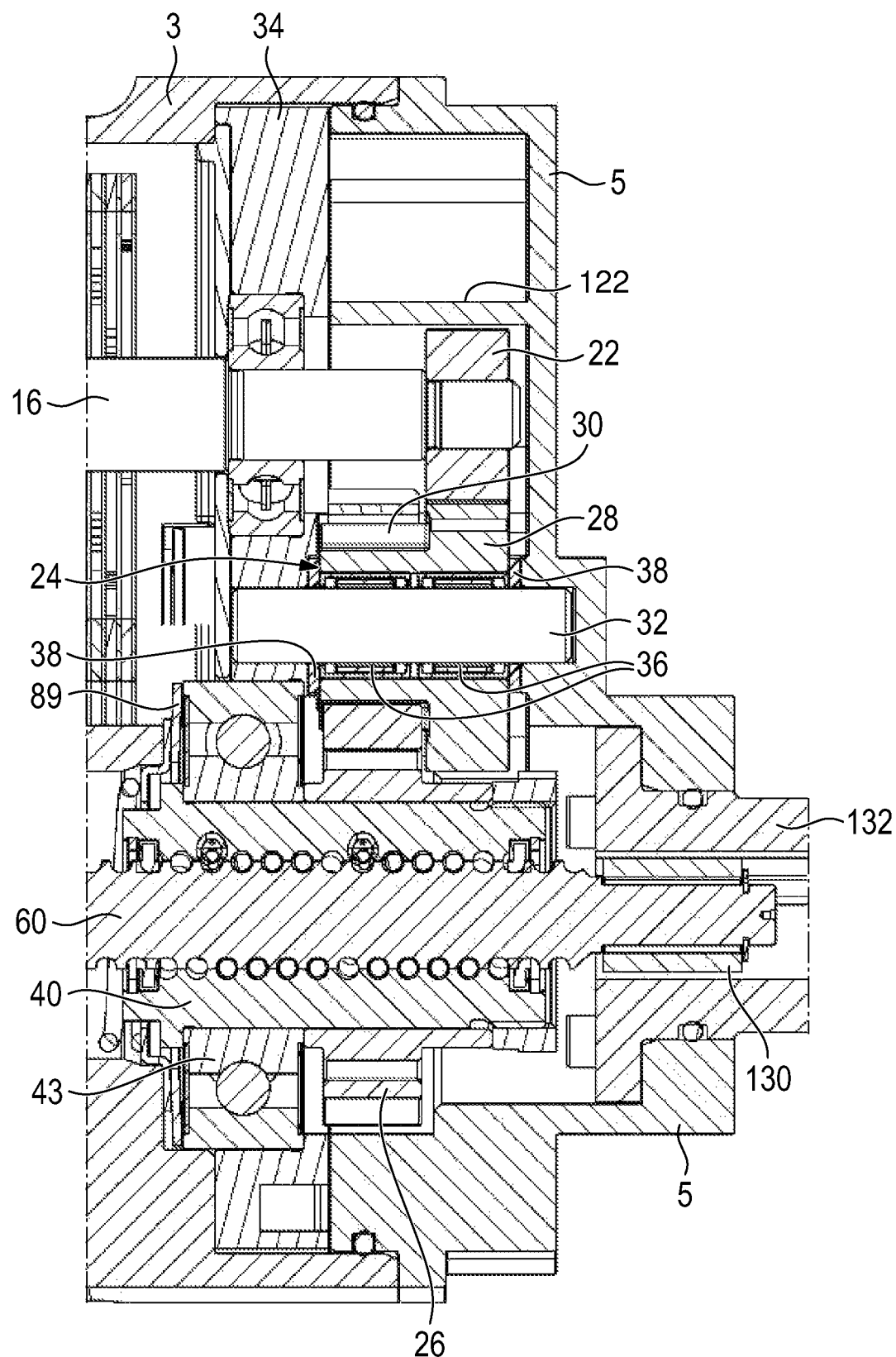
FIG. 4 shows a section along the plane IV-IV of FIG. 3.

The intermediate gear wheel 24 is a two-stage gear wheel which has an input toothing 28, in which the pinion 22 engages, and an output toothing 30, which interacts with the driving teeth 26 of the recirculating ball nut 40. As can be seen particularly in FIG. 4, the input toothing 28 and the output toothing 30 are provided in one piece on the intermediate gear wheel 24.

The diameter of the output toothing 30 is greater than the diameter of the input toothing 28. There results overall a step-down from the motor shaft 16 to the recirculating ball nut 40 that lies in the order of magnitude of 4.2:1 to 4.4:1.

The intermediate gear wheel 24 itself is mounted on a bearing pin 32 which is fixedly mounted on a base plate 34. In the exemplary embodiment shown, the bearing pin 32 is pressed into the base plate 34.

The intermediate gear wheel 24 is mounted on the bearing pin 32 by means of two needle bearings 36. A shaft sealing ring 38 is respectively provided on both sides of the needle bearings 36.

The base plate 34 serves to receive all the components of the gear mechanism 20 and to mount them relative to one another with low tolerance. This particularly concerns the rolling bearing 18 by which the motor shaft 16 is mounted, the bearing pin 32 by which the intermediate gear wheel 24 is mounted, and a rolling bearing 42 by which the recirculating ball nut 40 is mounted on the base plate 34.

Figure 2:
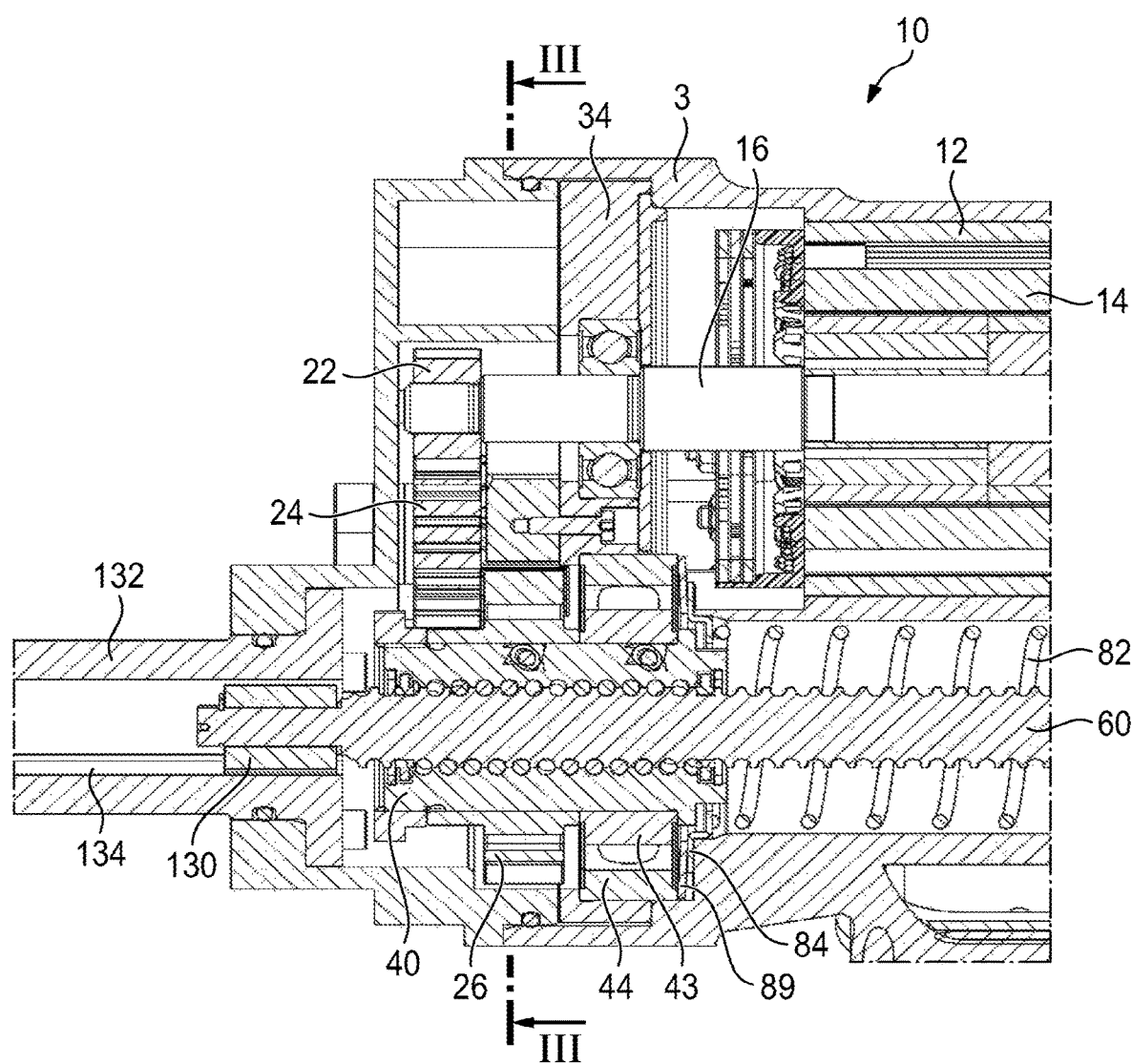
FIG. 2 shows the detail II of FIG. 1 on an enlarged scale.
Figure 3:
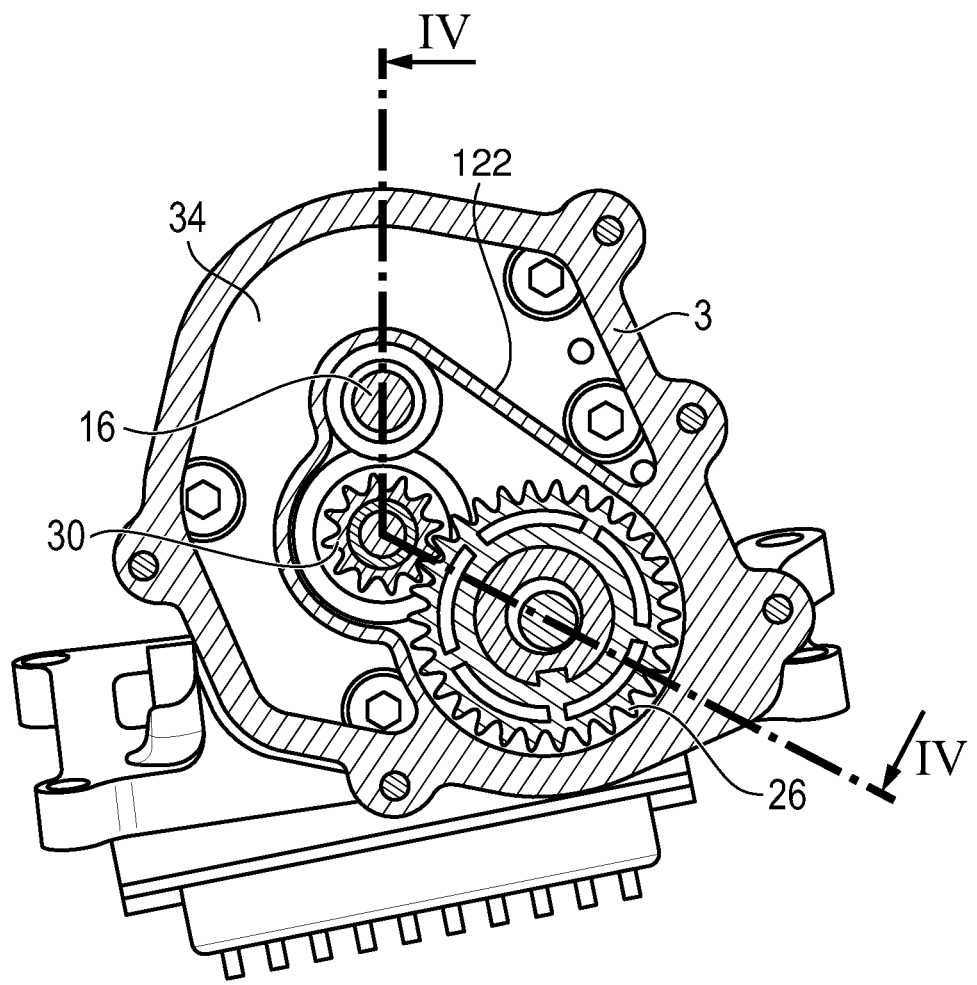
FIG. 3 shows a section along the plane III-III of FIG. 2.

The base plate 34 is a solid metal plate which is inserted into a shoulder provided in the housing. Said base plate can be screwed in the housing 3. In addition, it is braced against the housing 3 by the cover 5 (see in particular FIG. 2).

The rolling bearing 42 is a four-point bearing since it allows a slight deviation of the orientation of the centre axis of the recirculating ball nut 40 from its ideal orientation. The recirculating ball nut 40 can thus be optimally oriented if the spindle 60 is deflected in the radial direction on account of acting transverse loads.

In the exemplary embodiment shown, the four-point bearing 42 has an inner ring 43 which is pressed onto the outer surface of the recirculating ball nut 40, and an outer ring 44 which is held fixedly with respect to the housing.

According to an embodiment variant (not shown), the raceway for the rolling bearing balls of the four-point bearing 42 can also be ground directly into the outer surface of the recirculating ball nut 40.

The spindle 60 has an output end 62 which is arranged on the right-hand side in FIG. 1, said output end interacting with a guide piston 68 which is displaceably received in the housing 3 and which in turn interacts with the pressure plunger 80. For this purpose, the guide piston 68 is provided with a concave receptacle 70 in which the end of the pressure plunger 80 facing away from the disengagement lever of the clutch engages.

The guide piston is mounted so as to be displaceable in the spindle guide 9 in the housing 3, with the result that the spindle 60 is also precisely guided in an axially oriented manner when a radial force component is exerted by the pressure plunger 80.

The guide piston 68 has a cylindrical extension 66 which forms a piston receptacle 67 in which a relief piston 64 is received. On its side facing the spindle, the relief piston 64 has a concave receptacle in which the output end 62 of the spindle 60 is received.

The relief piston 64 is displaceable in the piston receptacle 67 in the axial direction, a relief spring 74 being arranged between the relief piston 64 and the guide piston 68 and urging the relief piston 64 relative to the guide piston 68 out of the piston receptacle 67 in the axial direction towards the spindle 60.

The relief spring 74 is here arranged between a bottom of the receptacle which is formed within the extension 66 and a shoulder on the relief piston 64. As a departure from the embodiment shown in which the relief spring 74 externally surrounds a portion of the relief piston 64, the relief spring 74 can also be arranged in a recess of the relief piston 64 that is open towards the guide piston 68.

In the exemplary embodiment shown, the extension 66 has a securing ring 76 on its open side facing away from the pressure plunger 80, with the result that the relief piston 64 is held captively within the piston receptacle 67 of the extension 66.

The relief piston 64 has a groove 78, in which a sliding element 79 is arranged, on its outer circumferential surface. The sliding element 79 is here a slotted ring made of plastic, in particular of PTFE. The sliding element 79 ensures that the relief piston 64 is displaceable in the axial direction within the extension 66 with low friction.

In order also to mount the guide piston 68 in a low-friction manner, two sliding elements 79 are provided which are likewise configured as slotted plastic rings which preferably consist of PTFE. In the same way as for the relief piston 64, the sliding elements 79 are arranged in a respective groove 78 in the outer circumferential surface. They therefore guide the guide piston 68 within the spindle guide 9.

In the spindle guide 9 there is arranged a compression spring 82 which is supported between the recirculating ball nut 40 and the guide piston 68, thus urging them away from one another. On the side of the recirculating ball nut 40, the compression spring 82 is supported here on an abutment plate 84.

On the side of the guide piston 68, the compression spring 82 is supported on an abutment ring 86 which consists of plastic. The latter bears in turn against a ring magnet 88 which, just like the abutment ring 86, is arranged on the extension 66. On account of the action of the compression spring 82, the ring magnet 88 is positioned and held on the guide piston 68 and moves together therewith.

Furthermore, the outer ring 44 of the four-point bearing 42 is axially preloaded by means of a disc spring 89, with the result that the recirculating ball nut 40 is always held in a defined, stabilized position. The disc spring is supported by its outer circumference on the outer ring 44 of the four-point bearing 42 and by its inner circumference on the abutment plate 84.

The ring magnet 88 interacts with a position sensor 90 which is arranged on the outer side of the extension 66 of the guide piston 68. The position sensor 90 can be a Hall sensor or GMR sensor.

As an alternative to the ring magnet 88, use can also be made of a segmented magnet with corresponding rotational securement on the guide piston 68.

As an alternative to a measuring system with a Hall or GMR sensor, an inductive measuring system is also possible. In this case, a target would be used instead of the ring magnet.

A further sensor is provided for detecting the rotation of the motor shaft 16. This sensor is arranged in the region of the mounting opening 4 (see in particular FIGS. 6 to 8).

On the motor shaft 16 there is arranged a magnet 92 whose magnetic field can be detected by a sensor 94. The sensor 94 is in particular a GMR sensor. Alternatively, it is in principle also possible to use a Hall sensor.

The sensor 94 is arranged on a carrier which is here formed by a printed circuit board 96 which is fixedly connected to a holder 98 made of plastic. In the exemplary embodiment shown, the printed circuit board 96 is screwed to the holder.

The printed circuit board 96 is arranged, together with the holder 98, in a pocket 99 which extends in the radial direction with respect to the centre axis of the motor shaft 16 and intersects the mounting opening 4.

For precise functioning of the sensor 94, it is important that it is oriented precisely relative to the motor shaft 16. For this purpose, the mounting opening 4 is used in the embodiment shown.

A plug 100 which interacts with a holding opening 102 in the holder 98 of the printed circuit board 96 is inserted in the mounting opening 4.

The plug 100 has a body part 104 whose outer dimensions correspond to the inside diameter of the mounting opening 4. Furthermore, the body part 104 is provided with a sealing ring 106 which seals within the mounting opening 4. In addition, the plug 100 is provided with a latching extension 108 which is slotted multiple times such that it can be compressed in the radial direction.

The latching extension 108 engages in the holding opening 102 such that the holder 98 and thus, via the printed circuit board 96, also the sensor 94 are positioned relative to the mounting opening 4. Since the mounting opening 4 is configured as a locating bore which is concentric to the centre axis of the motor shaft 16, the sensor 94 is thus also centred onto the centre axis of the motor shaft 16.

Figure 9:
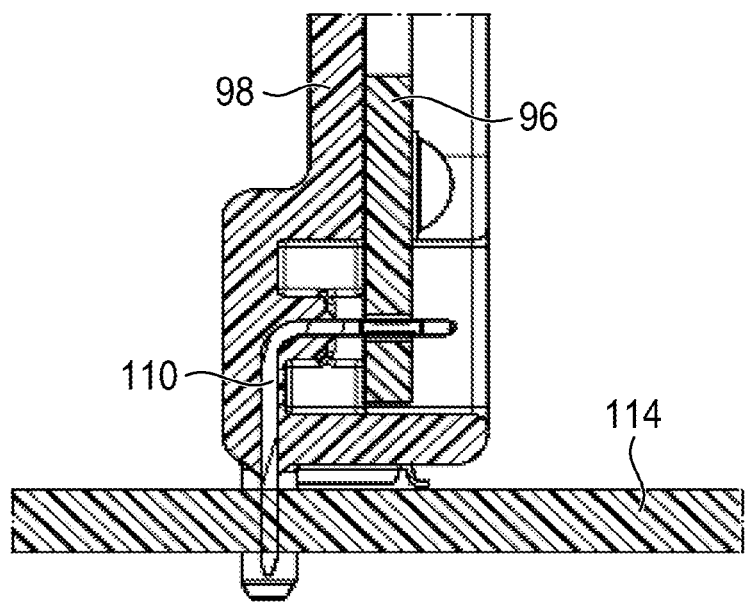
FIG. 9 shows, in an enlarged view, an alternative contacting of the printed circuit board shown in FIG. 6.
Figure 10:
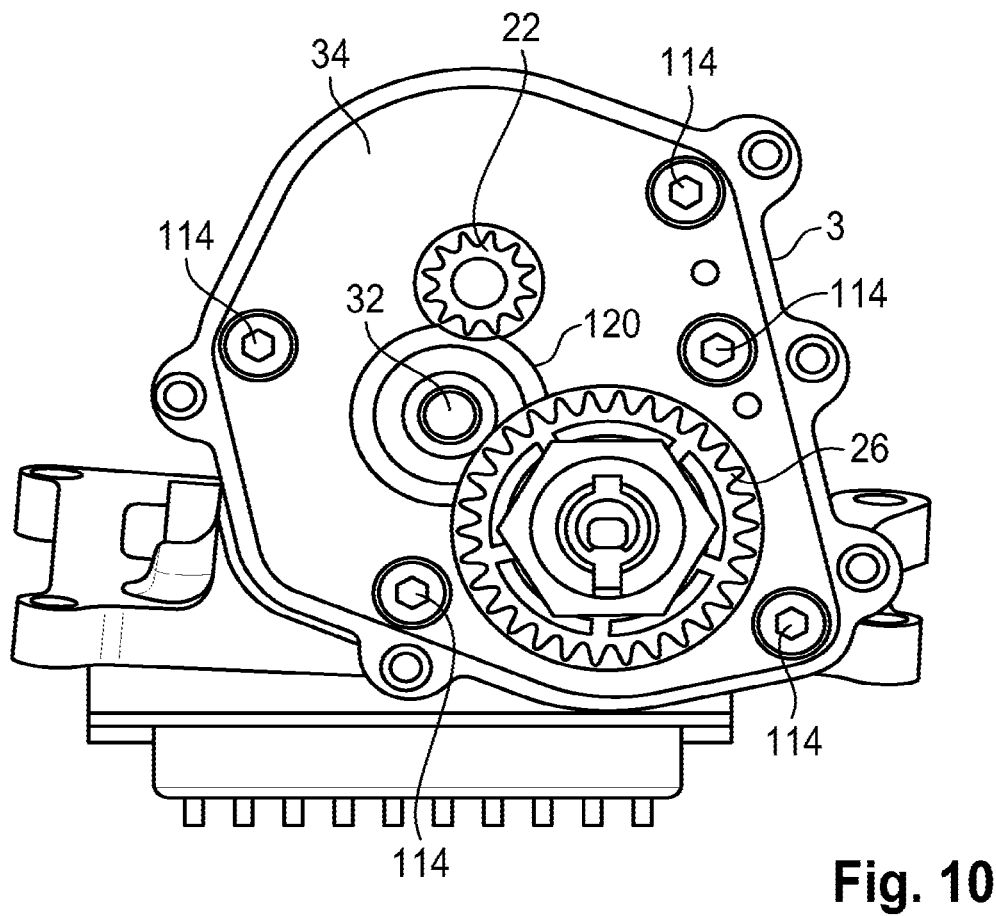
FIG. 10 shows a view similar to that of FIG. 3, wherein a cover and an intermediate gear wheel have been removed.
Figure 11:
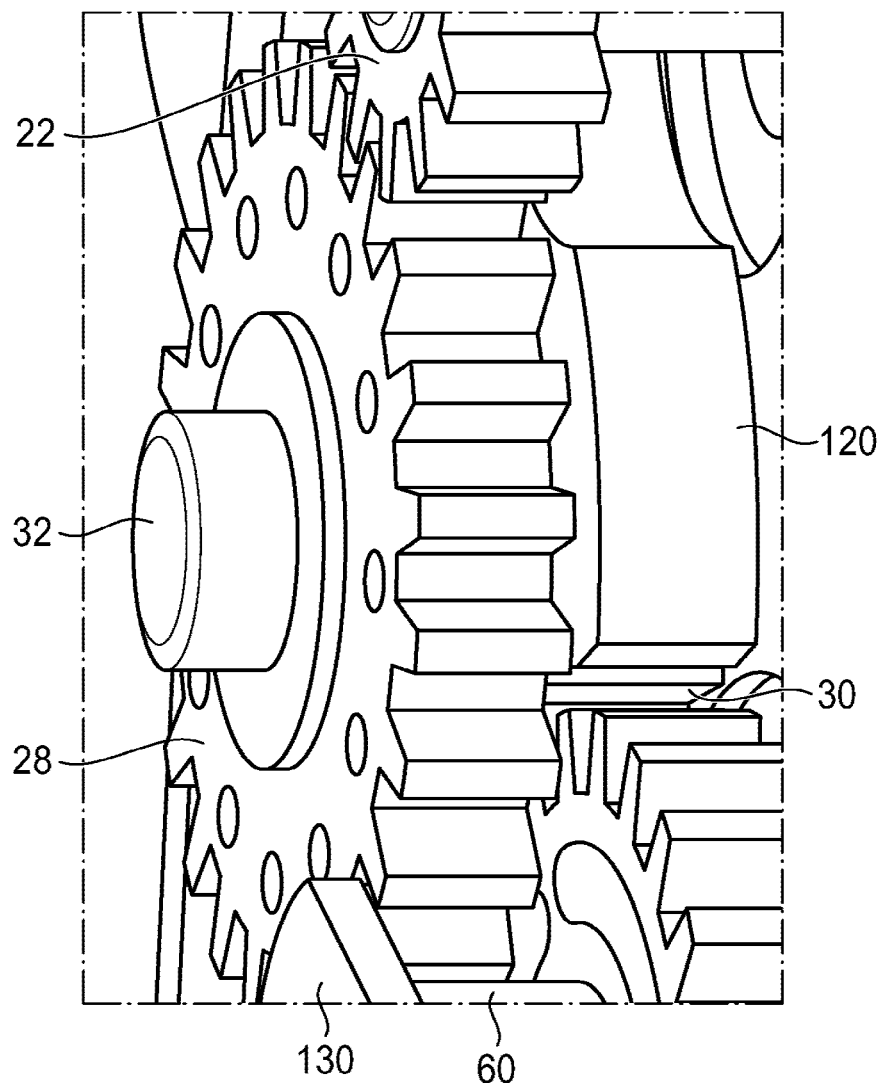
FIG. 11 shows a detail of the gear mechanism in a perspective view.
Figure 12:
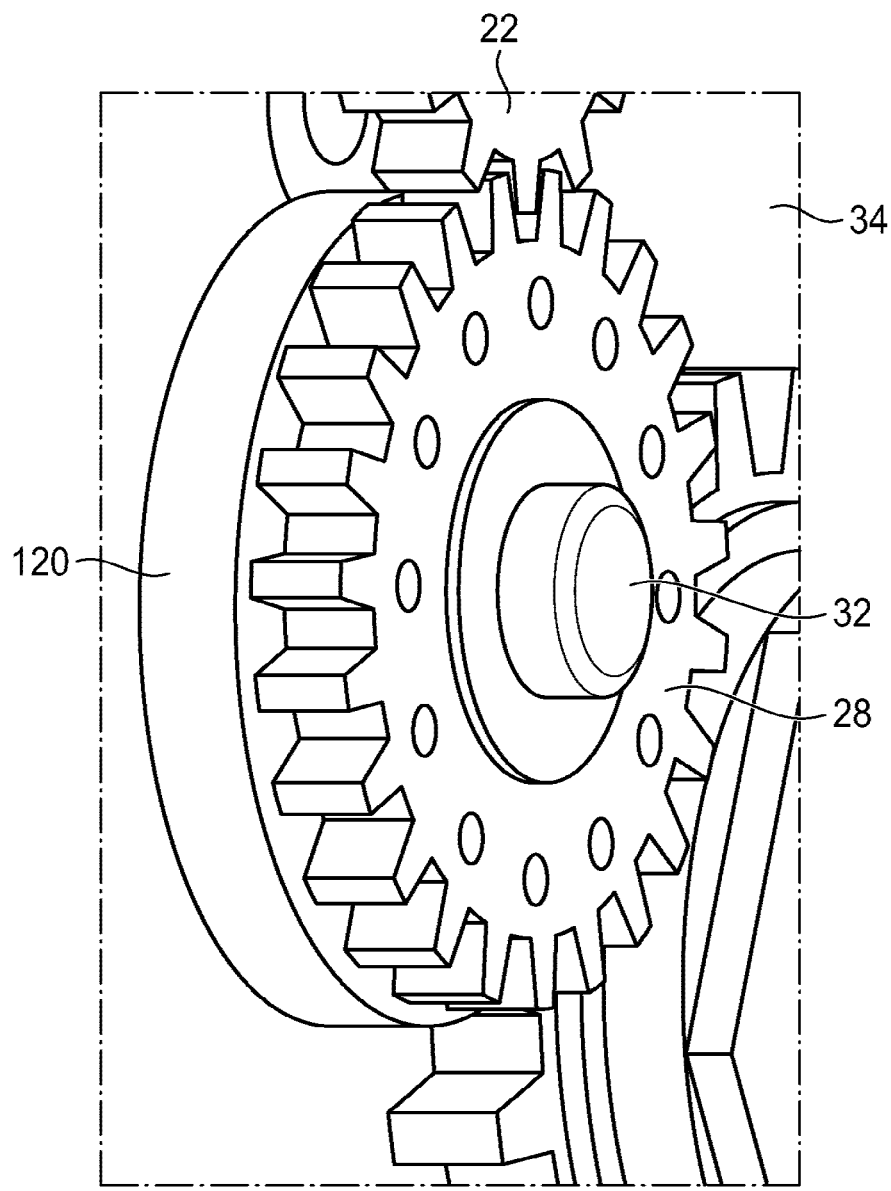
FIG. 12 shows a detail of the gear mechanism in a further perspective view.
Figure 13:
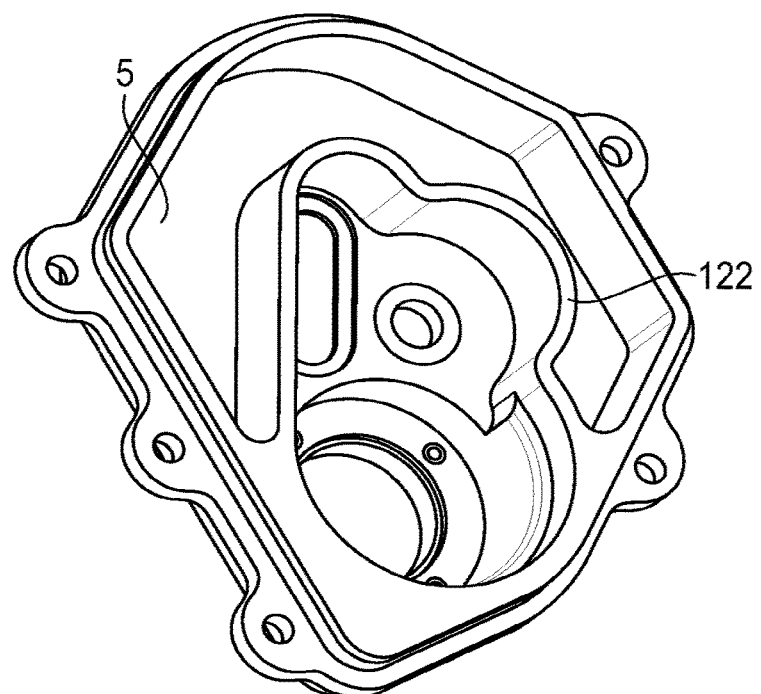
FIG. 13 shows the cover used for the housing in a perspective view.

As can be seen in FIG. 7, the printed circuit board 96 has a plurality of connection contacts 110 at its end facing away from the sensor 94. Here, either a cable 112 can be connected by which the printed circuit board 96 is connected to a main board, or the connection contacts 110 can be configured as press-in contacts (see FIG. 9) which are inserted into corresponding contact openings of a main board 114 when the main board 114 is mounted.

FIGS. 10 to 13 show details of the gear mechanism 20.

According to the variant shown here, the base plate 34 is fastened in the housing 3 using a number of screws 114.

A particular feature of the gear mechanism 20 is that there is provided a grease guide which ensures that grease present on the toothing cannot migrate into other regions.

The grease guide consists, firstly, of a bushing 120 which surrounds the output toothing 30 of the intermediate gear wheel 24 (with the exception of the region which allows the engagement in the driving teeth 26 of the recirculating ball nut 40).

The grease guide has, furthermore, a collar 122 which is configured in one piece with the cover 5 and extends from the cover towards the base plate 34. Here, the collar 122 surrounds the pinion 22, the intermediate gear wheel 24 and the driving teeth 26 of the recirculating ball nut 40.

Figure 14:
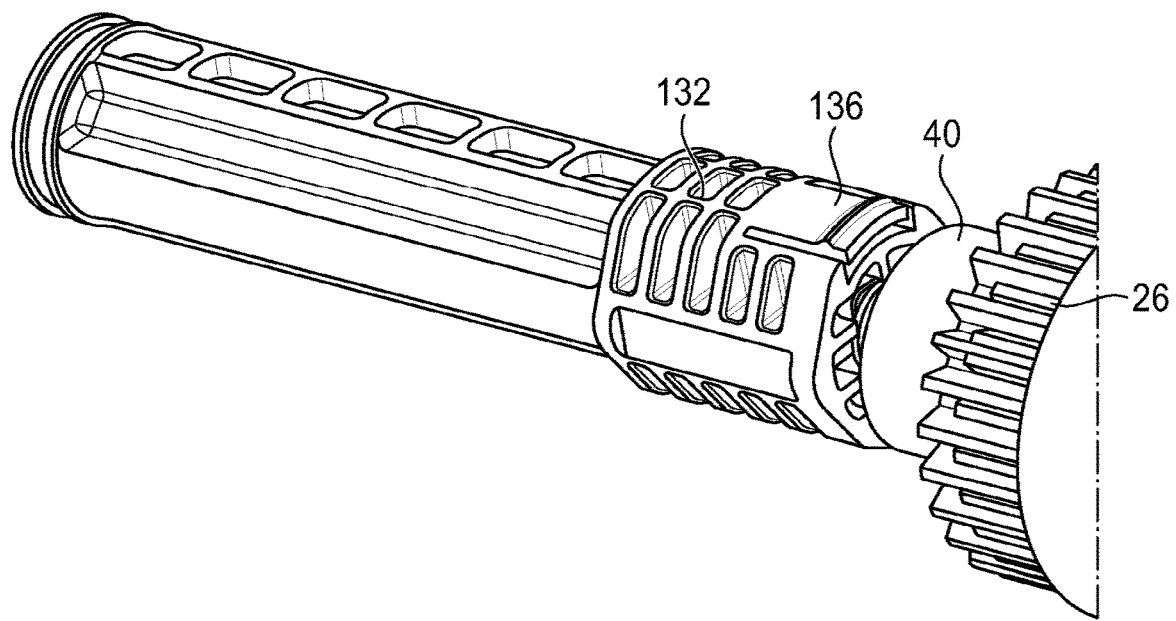
FIG. 14 shows the sliding guide for the spindle in a perspective view.
Figure 15:
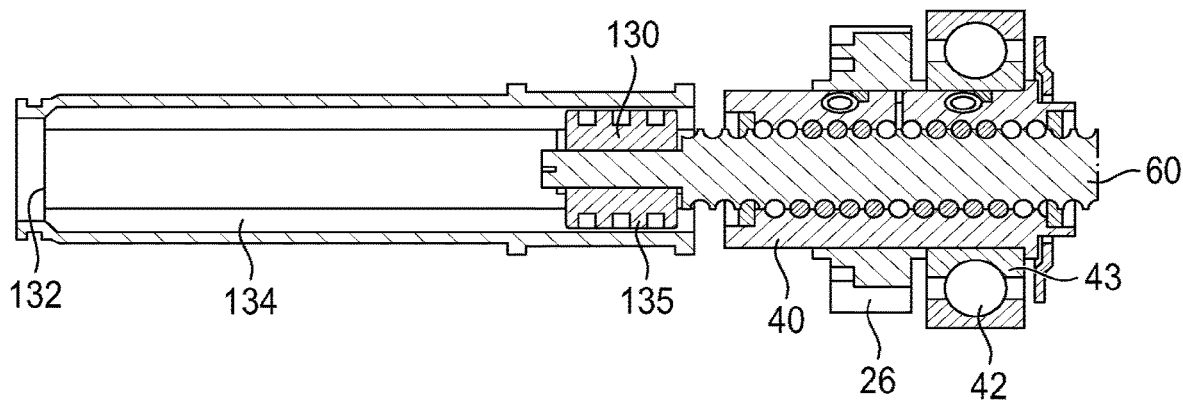
FIG. 15 shows a section through the sliding guide of FIG. 14.

It can be seen in FIGS. 14 and 15 how the spindle 60 is held in a rotationally fixed manner such that it does not corotate when the recirculating ball nut 40 is driven.

At the end opposite the output end 62 of the spindle 60, the latter is provided with a carriage 130 which is mounted on the spindle 60 in a rotationally fixed manner. For this purpose, the spindle 60 can be provided at this end with a square geometry, a hexagonal geometry or another suitable geometry.

The carriage 130 is displaceably received in a sliding guide 132, wherein the sliding guide is provided on the inner side with two longitudinal grooves 134 in which suitable lugs 135 of the carriage 130 engage. The carriage 130 is thus displaceable in the axial direction within the sliding guide 132. In addition, it is displaceable in the radial direction within certain limits, since the dimensions of the lugs 135 are slightly smaller than the dimensions of the longitudinal grooves 134.

The sliding guide 132 is a component made of plastic which is latched into the cover 5 of the housing 3. Latching tabs 136 can be used for this purpose.

Figure 16:
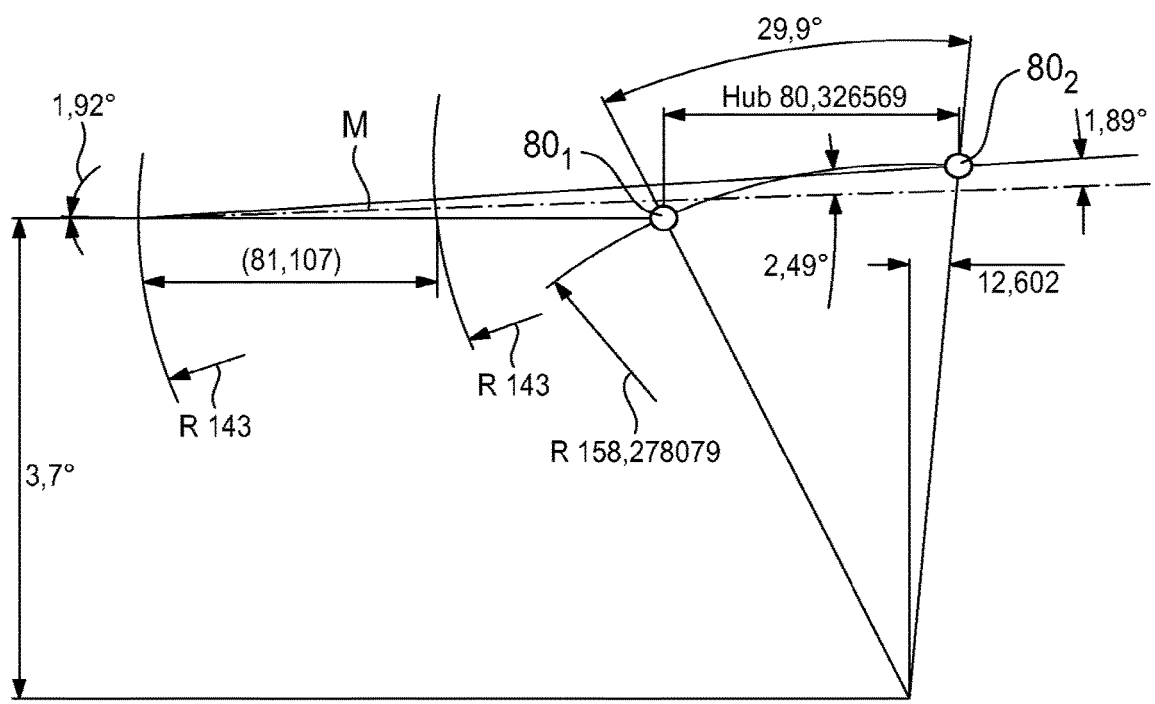
FIG. 16 shows the movement path of the spindle during the actuation of the disengagement lever.

FIG. 16 shows the geometric conditions for the adjustment of the pressure plunger 80. Its front end is adjustable between the two positions designated by the reference sign $80_1$ and the reference sign $80_2$. The position $80_2$ corresponds to a disengaged clutch in the new state. In the engaged position, the front end of the pressure plunger 80 (with new clutch) is situated about 25 mm left of the position $80_2$.

The stroke of the pressure plunger 80 is in the order of magnitude of 80 mm, with the result that a stroke in the order of magnitude of 55 mm is available for readjusting the disengagement lever in the case of wear.

From the radius of the disengagement lever, which is about 160 mm, and the maximum adjustment travel of the pressure plunger of 80 mm, there results a pivoting movement of the pressure plunger 80 by about 4 degrees between the two maximum positions $80_1$, $80_2$, since the end of the pressure plunger 80 that interacts with the disengagement lever also executes a radial movement between the engaged and the disengaged position.

In order to keep the loads on the guide piston 68 as low as possible, the centre axis M of the spindle 60 is oriented in such a way that it is situated approximately centrally between the orientation of the pressure plunger 80 in the two extreme positions $80_1$ and $80_2$.

The possible displacement travel of the guide piston 68 in the spindle guide 9 is considerably greater than the stroke for actuating the clutch. This is due to the fact that the clutch actuator 1 is used for readjusting the disengagement lever in the case of wear. In the new state of the clutch, the guide piston 68 is situated close to the right end of the spindle guide 9 and is adjusted to the right from there by the actuating stroke. Towards the end of the service life of the friction linings of the clutch, the guide piston 68 is situated at the left end of the spindle guide 9 and is adjusted to the right from there by the actuating stroke.

When the clutch actuator 1 engages the clutch, that is to say releases the disengagement lever, by the spindle 60 being driven to the left (with respect to FIG. 1) by the recirculating ball nut 40, the spindle 60 always executes a stroke which is greater by 1 to 2 mm than the stroke of the pressure plunger 80. Upon engagement of the clutch, it is possible, via the position sensor 90 and the ring magnet 88, to recognize when the guide piston 68 under the action of the clutch spring is not further adjusted within the spindle guide 9.

However, after the guide piston 68 has come to a standstill, the spindle 60 is further adjusted. Consequently, the relief piston 64 under the action of the relief spring 74 lifts from the bottom of the piston receptacle 67 within the extension 66. For this purpose, the electric motor 10 is further operated until such time as the relief piston 64 is separated from the guide piston 68 by the functionally desired distance (about 2 mm). The signal desired for this purpose pertaining to the number of revolutions of the electric motor 10 is provided by the sensor 94. The functionally required distance of about 2 mm between the relief piston 64 and the guide piston 68 ensures that the spindle 60 and hence the recirculating ball nut 40 are separated from the pressure plunger 80 and consequently no vibrations and load change stresses can be transmitted to the recirculating ball nut 40.

If the clutch is intended to be disengaged, first the play between the relief piston 64 and the guide piston 68 is removed. The spindle 60 then presses the guide piston 68 to the right with respect to FIG. 1, with the result that the clutch is disengaged.

The invention claimed is:

1. An electric clutch actuator comprising:
an electric motor;
a gear mechanism; and
a spindle which is coupled to the electric motor via the gear mechanism,
wherein the spindle, the gear mechanism, and the electric motor are received in a housing configured in one piece,
wherein the electric motor has a stator which is fastened in a cylindrical stator receptacle in the housing,
wherein the stator is adhesively bonded into the stator receptacle or screwed into the stator receptacle,
wherein the stator receptacle has a bottom wherein a mounting opening is provided which is configured concentrically with the stator receptacle, and
wherein a sensor which measures a rotation of a shaft of the electric motor is disposed in a region of the mounting opening, the sensor being arranged on a circuit board fixedly connected to a holder.

2. The electric clutch actuator according to claim 1, wherein the gear mechanism has a base plate which is inserted into an axial end of the housing.

3. The electric clutch actuator according to claim 2, wherein a cover is provided which closes the housing on an axial side, Wherein the base plate is braced against the housing by the cover.

4. The electric clutch actuator according to claim 1, wherein the housing consists of an aluminium die-cast material.

5. The electric clutch actuator according to claim 1, wherein a sliding guide for a carriage is provided on the housing and mounted on the spindle in a rotationally fixed manner.

6. The electric clutch actuator according to claim 1, wherein the stator is one of a 12V stator and a 24V stator which have identical external dimensions.

7. The electric clutch actuator according to claim 1, wherein a plug interacts with a holding opening in the holder, the plug being inserted into the mounting opening and including a body part with outer dimensions corresponding to an inside diameter of the mounting opening, and a latching extension that is compressible in a radial direction and engaged in the holding opening.

* * * * *